United States Patent
Chang

(10) Patent No.: US 9,362,827 B2
(45) Date of Patent: Jun. 7, 2016

(54) SOFT-SWITCHING BI-DIRECTIONAL POWER CONVERTER AND METHOD OF OPERATING THE SAME

(71) Applicant: DELTA ELECTRONICS, INC., Taoyuan County (TW)

(72) Inventor: Yu-Ming Chang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 0 days.

(21) Appl. No.: 14/641,631

(22) Filed: Mar. 9, 2015

(65) Prior Publication Data
US 2015/0381047 A1 Dec. 31, 2015

(30) Foreign Application Priority Data
Jun. 25, 2014 (TW) .............................. 103121845 A

(51) Int. Cl.
*H02M 7/48* (2007.01)
*H02M 1/00* (2006.01)
*H02M 3/158* (2006.01)

(52) U.S. Cl.
CPC ............ *H02M 3/158* (2013.01); *H02M 3/1582* (2013.01); *H02M 2001/0058* (2013.01)

(58) Field of Classification Search
CPC ............. H02M 2007/4815; H02M 2001/0058; H02M 3/158; H02M 3/1582; H02M 3/1588
USPC .................. 323/222, 223, 224, 259, 282–288
See application file for complete search history.

(56) References Cited

U.S. PATENT DOCUMENTS

| | | | | |
|---|---|---|---|---|
| 6,111,770 A * | 8/2000 | Peng | ................... | H02M 7/4826 363/131 |
| 6,462,962 B1 * | 10/2002 | Cuk | ........................ | H02M 1/34 363/131 |
| 2005/0265055 A1 * | 12/2005 | Chang | ................... | H02M 3/158 363/89 |
| 2007/0025125 A1 * | 2/2007 | Nakahori | ................ | H02M 1/32 363/56.02 |
| 2008/0309301 A1 * | 12/2008 | Shimada | ............... | H02M 3/158 323/282 |

OTHER PUBLICATIONS

JP2003-033013A, Furukawa Katsuhiko, Jan. 31, 2003,Resonance-Type Bidirectional DC-to-DC Converter, and Its Control Method.*
Machine English Translation of JP2001-037214A, Matsuda Yoshiaki,Power Source Circuit,Sep. 2, 2001.*
Machine English Translation of JP2003-153527A, Konishi Yoshihiro, Step-Up Chopper Circuit, Step-Up Chopper Circuit.*

* cited by examiner

Primary Examiner — Timothy J Dole
Assistant Examiner — Sisay G Tiku
(74) Attorney, Agent, or Firm — Hauptman Ham, LLP

(57) ABSTRACT

A soft-switching bi-directional power converter includes a main inductor, a bi-directional switch module, a first switch module, a second switch module, and a control unit. The bi-directional switch module has a bi-directional switch and a resonance inductor. The first switch module has a first switch and a first resonance capacitor; the second switch module has a second switch and a second resonance capacitor. When the bi-directional switch is controlled to occur a resonance of the resonance inductor and the first and the second resonance capacitors so that a voltage of the first resonance capacitor drops to zero, the first switch is turned; when the bi-directional switch is controlled to occur a resonance thereof so that a voltage of the second resonance capacitor drops to zero, the second switch is turned on. Accordingly, the power converter can implement the bi-directional soft switching function.

16 Claims, 7 Drawing Sheets

US 9,362,827 B2

SOFT-SWITCHING BI-DIRECTIONAL POWER CONVERTER AND METHOD OF OPERATING THE SAME

BACKGROUND

1. Technical Field

The present disclosure relates generally to a power converter and a method of operating the same, and more particularly to a soft-switching bi-directional power converter and a method of operating the same.

2. Description of Related Art

Reference is made to FIG. 1 which is a circuit diagram of a related art non-isolated DC-to-DC converter. The non-isolated DC-to-DC converter includes an input capacitor Ci, a main inductor L, a main switch Sm, a main diode Db, and an output capacitor Co, and supplies power to an external load $R_L$. The conventional non-isolated DC-to-DC converter is a hard switching topology. Hence, the higher switching frequency results in the increased switching losses and enlarged size of the heat-dissipating device. In addition, the electromagnetic interference issue would be more serious due to the higher switching frequency. Also, the size of the EMI filter for solving the EMI issue would be enlarged.

Furthermore, the conventional non-isolated DC-to-DC converter usually provides uni-directional power transmission, that is, the power generated from the non-isolated DC-to-DC converter is transmitted from the input capacitor Ci to the output capacitor Co to supply power to the external load $R_L$. It is much complicated to implement the bi-directional power transmission as well as soft-switching functions for the non-isolated DC-to-DC converter.

Accordingly, it is desirable to provide a soft-switching bi-directional power converter to generate complementary control signals to correspondingly control two transistor switches of the bi-directional switch to implement soft-switching bi-directional operation.

SUMMARY

An object of the present disclosure is to provide a soft-switching bi-directional power converter to solve the above-mentioned problems. Accordingly, the soft-switching bi-directional power converter has an input side and an output side. The bi-directional power converter includes a bi-directional switch module, a main inductor, a first switch module, a second switch module, and a control unit. The bi-directional switch module is connected to the input side, and has a bi-directional switch and a resonance inductor connected to the bi-directional switch in series. The main inductor is connected in parallel to the bi-directional switch module. The first switch module is connected to the bi-directional switch module and the main inductor, and has a first switch and a first resonance capacitor. The second switch module is connected to the bi-directional switch module and the main inductor, and has a second switch and a second resonance capacitor. When a resonance occurs between the resonance inductor, the first resonance capacitor, and the second resonance capacitor, a voltage of the first resonance capacitor is reduced to zero and the control unit turns on the first switch and switches the first switch so that power generated from the bi-directional power converter is transmitted from the input side to the output side; when the resonance occurs between the resonance inductor, the first resonance capacitor, and the second resonance capacitor, a voltage of the second resonance capacitor is reduced to zero and the control unit turns on the second switch and switches the second switch so that power generated from the bi-directional power converter is transmitted from the output side to the input side.

Another object of the present disclosure is to provide a soft-switching bi-directional power converter to solve the above-mentioned problems. Accordingly, the method includes steps of: (a) providing a bi-directional switch module, the bi-directional switch module connected to the input side, and having a bi-directional switch and a resonance inductor; (b) providing a main inductor, the main inductor connected in parallel to the bi-directional switch module; (c) providing a first switch module, the first switch module connected to the bi-directional switch module and the main inductor, and having a first switch and a first resonance capacitor; (d) providing a second switch module, the second switch module connected to the bi-directional switch module and the main inductor, and having a second switch and a second resonance capacitor; (e) providing a control unit; and (f) reducing a voltage of the first resonance capacitor to zero and turning on the first switch and switching the first switch by the control unit so that power generated from the bi-directional power converter is transmitted from the input side to the output side when a resonance occurs between the resonance inductor, the first resonance capacitor, and the second resonance capacitor; reducing a voltage of the second resonance capacitor to zero and turning on the second switch and switching the second switch by the control unit so that power generated from the bi-directional power converter is transmitted from the output side to the input side when a resonance occurs between the resonance inductor, the first resonance capacitor, and the second resonance capacitor.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
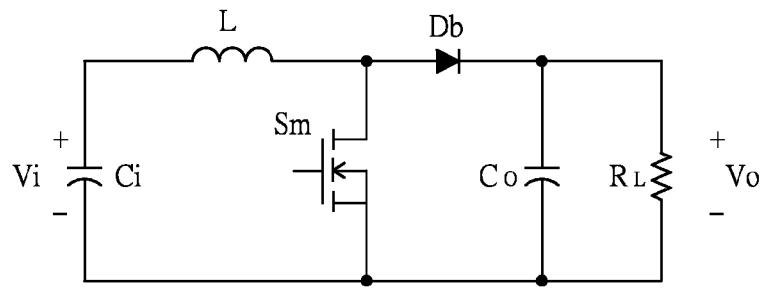
FIG. 1 is a circuit diagram of a related art non-isolated DC-to-DC converter.

Reference will now be made to the drawing figures to describe the present invention in detail.

Figure 2:
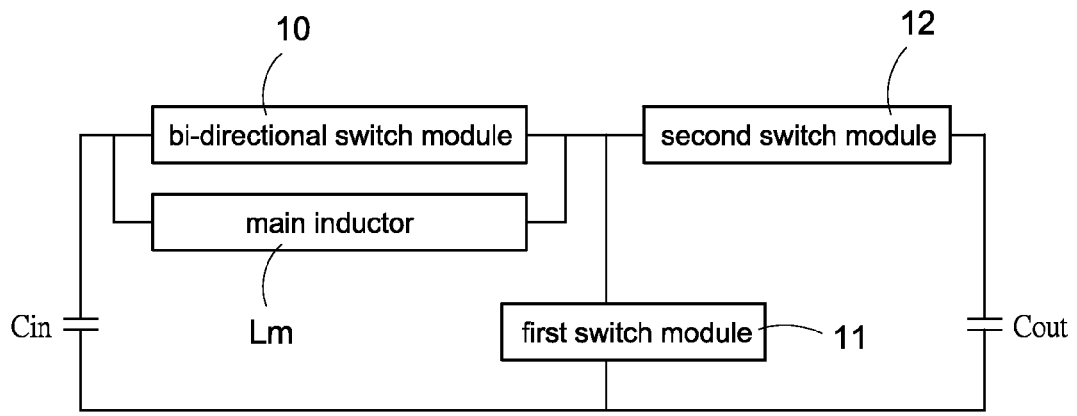
FIG. 2 is a schematic block diagram of a soft-switching bi-directional power converter according to the present disclosure.

Reference is made to FIG. 2 which is a schematic block diagram of a soft-switching bi-directional power converter according to the present disclosure. The soft-switching bi-directional power converter has an input side Sin and an output side Sout, and includes a bi-directional switch module 10, a main inductor Lm, a first switch module 11, a second switch module 12, and a control unit 13 (see FIG. 4). An input capacitor Cin is connected at the input side Sin and an output capacitor Cout is connected at the output side Sout. The bi-directional switch module 10 is connected to the input capacitor Cin, the main inductor Lm, the first switch module 11, and the second switch module 12. The output capacitor Cout is connected to the first switch module 11 and the second switch module 12.

Figure 3:
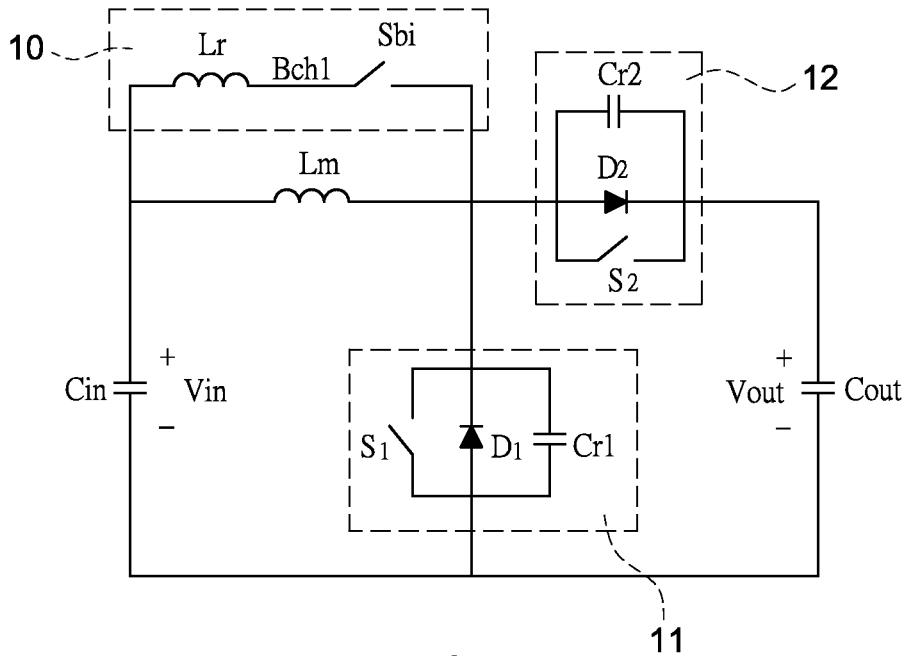
FIG. 3 is a circuit diagram of the soft-switching bi-directional power converter according to the present disclosure.

Reference is made to FIG. 3 which is a circuit diagram of the soft-switching bi-directional power converter according to the present disclosure. The bi-directional switch module 10 is connected to the input capacitor Cin at the input side Sin, and mainly includes a bi-directional switch Sbi, a resonance inductor Lr. The resonance inductor Lr is connected to the bi-directional switch Sbi in series to form a first branch Bch1, and the main inductor Lm is connected to the first branch Bch1 in parallel. The first switch module 11 includes a first switch S1, a first diode D1, and a first resonance capacitor Cr1. The first diode D1 is connected to the first switch S1 in parallel, and the first resonance capacitor Cr1 is connected to the first switch S1 and the first diode D1 in parallel. The second switch module 12 includes a second switch S2, a second diode D2, and a second resonance capacitor Cr2. The second diode D2 is connected to the second switch S2 in parallel, and the second resonance capacitor Cr2 is connected to the second switch S2 and the second diode D2 in parallel.

Figure 4:
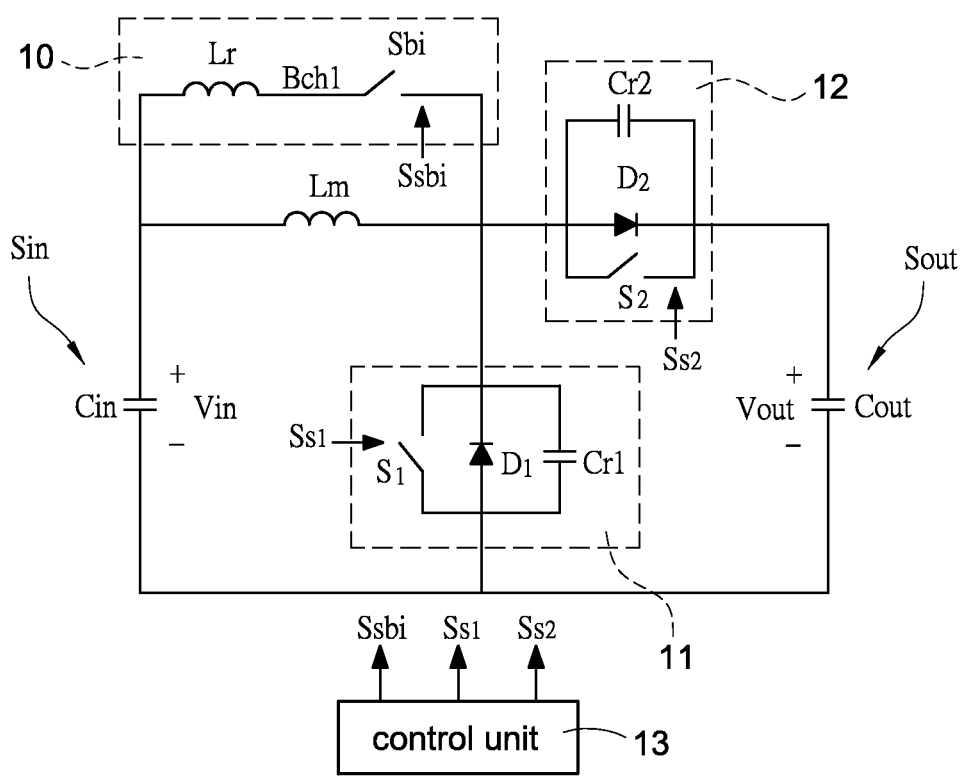
FIG. 4 is a schematic view of controlling the soft-switching bi-directional power converter according to the present disclosure.

Reference is made to FIG. 4 which is a schematic view of controlling the soft-switching bi-directional power converter according to the present disclosure. Comparing to FIG. 3, FIG. 4 further illustrates a control unit 13 in the bi-directional power converter. The control unit 13 is operatively connected to the bi-directional switch module 10, the first switch module 11, and the second switch module 12. In other words, the control unit 13 generates a bi-directional switch control signal Ssbi, a first switch control signal Ss1, and a second switch control signal Ss2. Also, the bi-directional switch control signal Ssbi is used to control the bi-directional switch Sbi, the first switch control signal Ss1 is used to control the first switch S1, and the second switch control signal Ss2 is used to control the second switch S2.

Figure 5A:
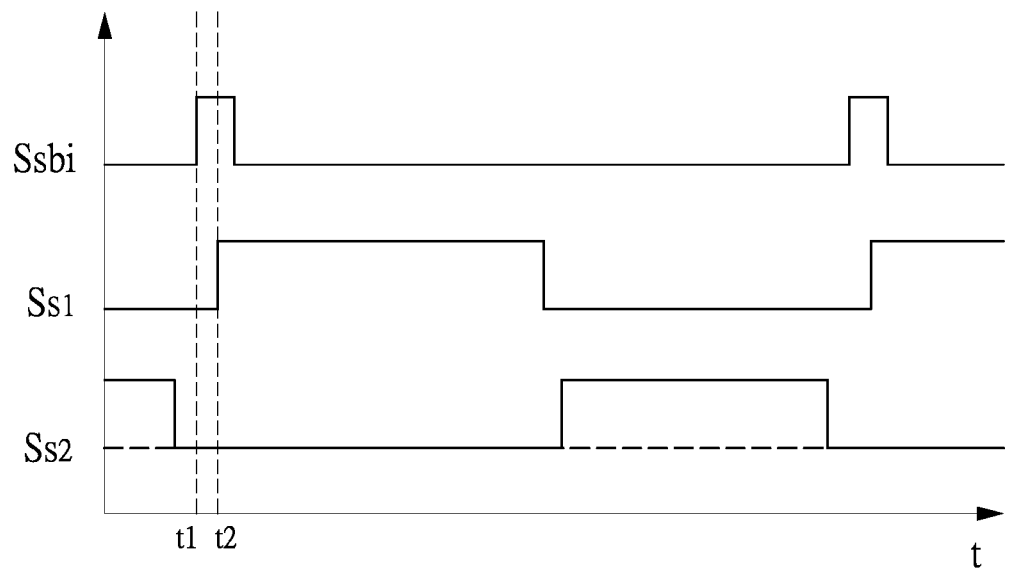
FIG. 5A is a waveform of control signals for transmitting power generated from the soft-switching bi-directional power converter from an input side to an output side according to the present disclosure.
Figure 5B:
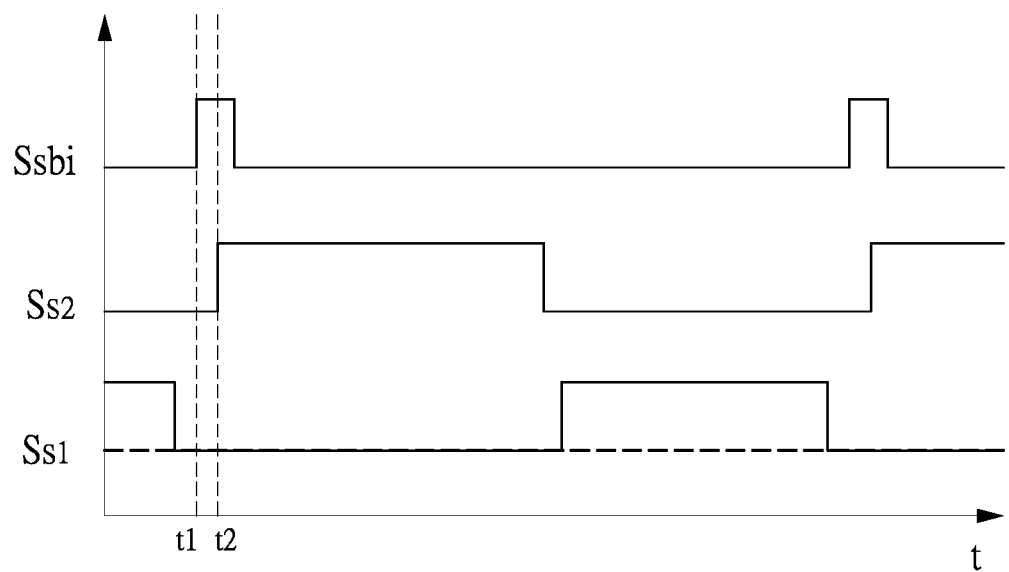
FIG. 5B is a waveform of control signals for transmitting power generated from the soft-switching bi-directional power converter from the output side to the input side according to the present disclosure.

The detailed operation of the bi-directional power transmission of the soft-switching bi-directional power converter will be described hereinafter as follows. Reference is made to FIG. 5A and FIG. 5B which are waveforms of control signals for transmitting power generated from the soft-switching bi-directional power converter from an input side to an output side and from the output side to the input side according to the present disclosure, respectively.

When a resonance occurs between the resonance inductor Lr, the first resonance capacitor Cr1, and the second resonance capacitor Cr2, a voltage of the first resonance capacitor Cr1 is reduced to zero and the control unit 13 turns on the first switch S1 so that the power generated from the bi-directional power converter is transmitted from the input side Sin to the output side Sout. As shown in FIG. 5A, the control unit 13 controls the bi-directional switch control signal Ssbi turning on the bi-directional switch Sbi when the current flowing the resonance inductor Lr is zero at a time point t1. Accordingly, the bi-directional switch Sbi is zero-current turned on to soft switch the bi-directional switch Sbi. Afterward, the control unit 13 controls the first switch control signal Ss1 turning on the first switch S1 when the resonance occurs between the resonance inductor Lr, the first resonance capacitor Cr1, and the second resonance capacitor Cr2, and the voltage of the first resonance capacitor Cr1 is reduced to zero at a time point t2. Accordingly, the first switch S1 is zero-voltage turned on to soft switch the first switch S1 and the power generated from the soft-switching bi-directional power converter from the input side Sin to the output side Sout.

Especially, in the operation of transmitting the power from the input side Sin to the output side Sout, the second switch control signal Ss2 and the first switch control signal Ss1 are complementary signals and a dead time is inserted between the two switch control signals as shown by the solid line. In this embodiment, lower conversion losses can be achieved. In addition, the second switch control signal Ss2 can also be a low-level turned-off signal as shown by the dotted line. More specifically, the turned-on timing and the duty cycle of the first switch control signal Ss1 dominate the operation of transmitting the power from the input side Sin to the output side Sout. Also, the turned-on timing of the bi-directional switch control signal Ssbi is appropriately controlled to provide the soft-switching operation when the power is transmitted from the input side Sin to the output side Sout.

When a resonance occurs between the resonance inductor Lr, the first resonance capacitor Cr1, and the second resonance capacitor Cr2, a voltage of the second resonance capacitor Cr2 is reduced to zero and the control unit 13 turns on the second switch S2 so that the power generated from the bi-directional power converter is transmitted from the output side Sout to the input side Sin. As shown in FIG. 5B, the control unit 13 controls the bi-directional switch control signal Ssbi turning on the bi-directional switch Sbi when the current flowing the resonance inductor Lr is zero at a time point t1. Accordingly, the bi-directional switch Sbi is zero-current turned on to soft switch the bi-directional switch Sbi. Afterward, the control unit 13 controls the second switch control signal Ss2 turning on the second switch S2 when the resonance occurs between the resonance inductor Lr, the first resonance capacitor Cr1, and the second resonance capacitor Cr2, and the voltage of the second resonance capacitor Cr2 is reduced to zero at a time point t2. Accordingly, the second switch S2 is zero-voltage turned on to soft switch the second switch S2 and the power generated from the soft-switching bi-directional power converter from the output side Sout to the input side Sin.

Especially, in the operation of transmitting the power from the output side Sout to the input side Sin, the first switch control signal Ss1 and the second switch control signal Ss2 are complementary signals and a dead time is inserted between the two switch control signals as shown by the solid line. In this embodiment, lower conversion losses can be achieved. In addition, the first switch control signal Ss1 can also be a low-level turned-off signal as shown by the dotted line. More specifically, the turned-on timing and the duty cycle of the second switch control signal Ss2 dominate the operation of transmitting the power from the output side Sout to the input side Sin. Also, the turned-on timing of the bi-directional switch control signal Ssbi is appropriately controlled to provide the soft-switching operation when the power is transmitted from the output side Sout to the input side Sin.

Figure 6A:
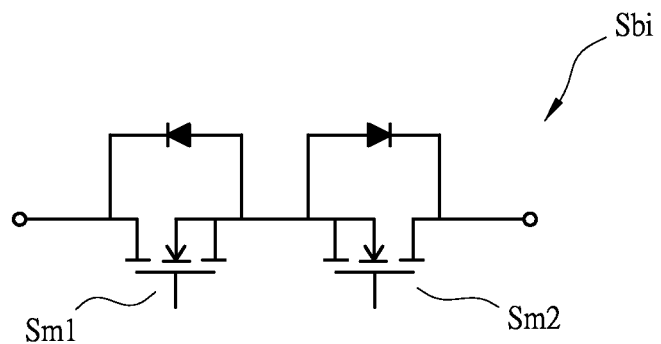
FIG. 6A is a circuit diagram of a bi-directional switch according to a first embodiment of the present disclosure.
Figure 6B:
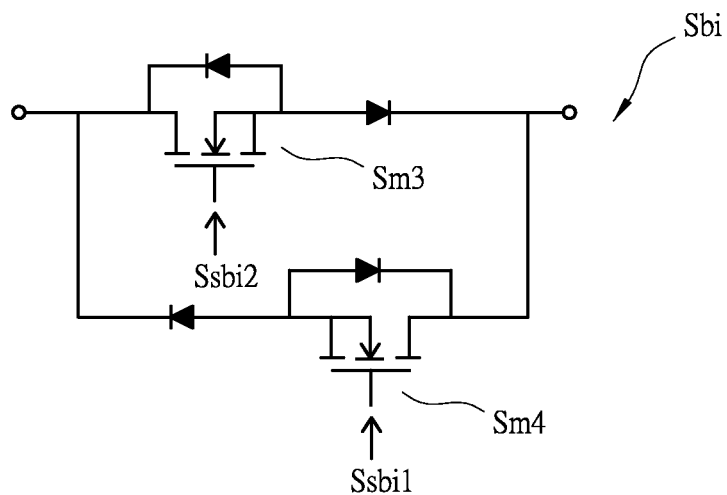
FIG. 6B is a circuit diagram of the bi-directional switch according to a second embodiment of the present disclosure.

Reference is made from FIG. 6A to FIG. 6G which are circuit diagrams of the bi-directional switch according to seven embodiments of the present disclosure. In FIG. 6A and FIG. 6B, the bi-directional switch Sbi is composed of two MOSFET switches.

In FIG. 6A, each MOSFET switch is connected in parallel to one body diode. Further, one in-parallel MOSFET and body diode are connected in series to the other in-parallel MOSFET and body diode in the back-to-back connection so that the bi-directional switch module 10 can provide the bi-directional soft switching function. In this embodiment, the two sources of the two MOSFET switches are electrically connected to each other.

For the first embodiment in FIG. 6A, the bi-directional switch control signal Ssbi has a first bi-directional switch control signal Ssbi1 and a second bi-directional switch control signal Ssbi2, and the first bi-directional switch control signal Ssbi1 is used to control a first MOSFET switch Sm1 and the second bi-directional switch control signal Ssbi2 is used to control a second MOSFET switch Sm2. The first bi-directional switch control signal Ssbi1 is in a high-level condition to turn on the first MOSFET switch Sm1, and the second bi-directional switch control signal Ssbi2 is in a high-level condition to turn on the second MOSFET switch Sm2.

In FIG. 6B, the bi-directional switch Sbi is composed of two MOSFET switches and two diodes. Each MOSFET switch is connected in parallel to one body diode. Further, the in-parallel MOSFET and body diode are connected in series to one diode to form one electrical branch so that the bi-directional switch module 10 can provide the bi-directional soft switching function through the two in-parallel electrical branches of the bi-directional switch Sbi.

For the second embodiment in FIG. 6B, the bi-directional switch control signal Ssbi has a first bi-directional switch control signal Ssbi1 and a second bi-directional switch control signal Ssbi2, and the first bi-directional switch control signal Ssbi1 is used to control a fourth MOSFET switch Sm4 and the second bi-directional switch control signal Ssbi2 is used to control a third MOSFET switch Sm3. When the first bi-directional switch control signal Ssbi1 is in a high-level condition to turn on the fourth MOSFET switch Sm4, the second bi-directional switch control signal Ssbi2 is in a low-level condition to turn off the third MOSFET switch Sm3. Accordingly, the bi-directional switch module 10 provides the soft switching function when the operation of transmitting the power from the input side Sin to the output side Sout. On the contrary, when the first bi-directional switch control signal Ssbi1 is in a low-level condition to turn off the fourth MOSFET switch Sm4, the second bi-directional switch control signal Ssbi2 is in a high-level condition to turn on the third MOSFET switch Sm3. Accordingly, the bi-directional switch module 10 provides the soft switching function when the operation of transmitting the power from the output side Sout to the input side Sin.

Figure 6C:
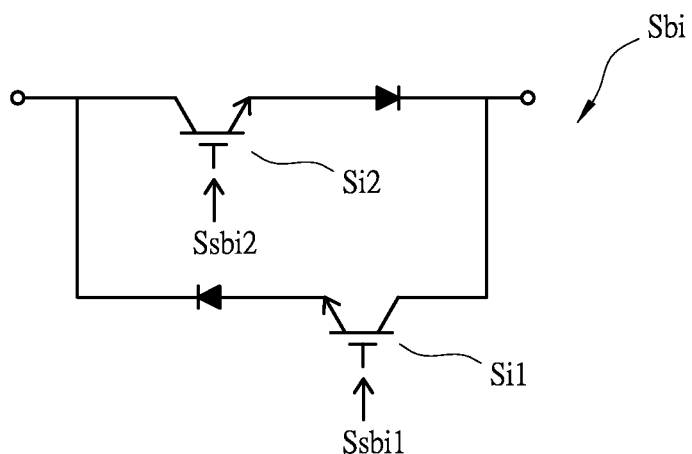
FIG. 6C is a circuit diagram of the bi-directional switch according to a third embodiment of the present disclosure.

In FIG. 6C, the bi-directional switch Sbi is composed of two IGBT switches and two diodes. Each IGBT switch is connected in series to one diode to form one electrical branch so that the bi-directional switch module 10 can provide the bi-directional soft switching function through the two in-parallel electrical branches of the bi-directional switch Sbi.

For the third embodiment in FIG. 6C, the bi-directional switch control signal Ssbi has a first bi-directional switch control signal Ssbi1 and a second bi-directional switch control signal Ssbi2, and the first bi-directional switch control signal Ssbi1 is used to control a first IGBT switch Si1 and the second bi-directional switch control signal Ssbi2 is used to control a second IGBT switch Si2. When the first bi-directional switch control signal Ssbi1 is in a high-level condition to turn on the first IGBT switch Si1, the second bi-directional switch control signal Ssbi2 is in a low-level condition to turn off the second IGBT switch Si2. Accordingly, the bi-directional switch module 10 provides the soft switching function when the operation of transmitting the power from the input side Sin to the output side Sout. On the contrary, when the first bi-directional switch control signal Ssbi1 is in a low-level condition to turn off the first IGBT switch Si1, the second bi-directional switch control signal Ssbi2 is in a high-level condition to turn on the second IGBT switch Si2. Accordingly, the bi-directional switch module 10 provides the soft switching function when the operation of transmitting the power from the output side Sout to the input side Sin.

Figure 6D:
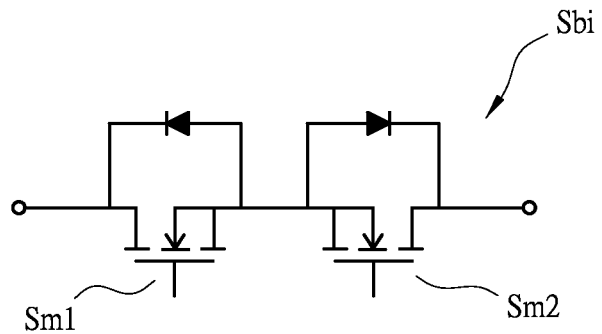
FIG. 6D is a circuit diagram of the bi-directional switch according to a fourth embodiment of the present disclosure.
Figure 6E:
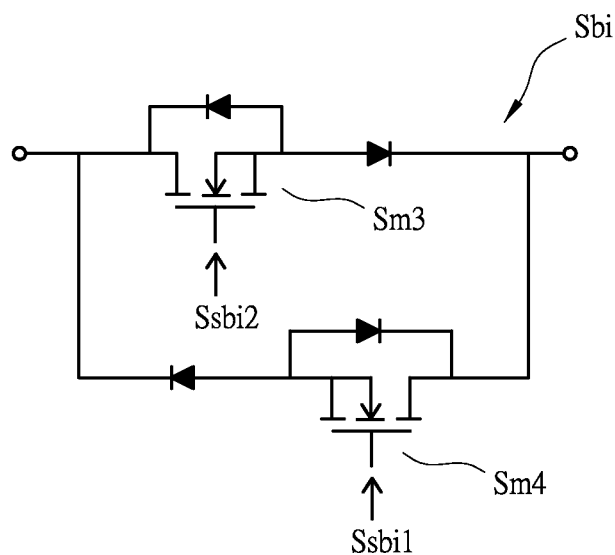
FIG. 6E is a circuit diagram of the bi-directional switch according to a fifth embodiment of the present disclosure.
Figure 6F:
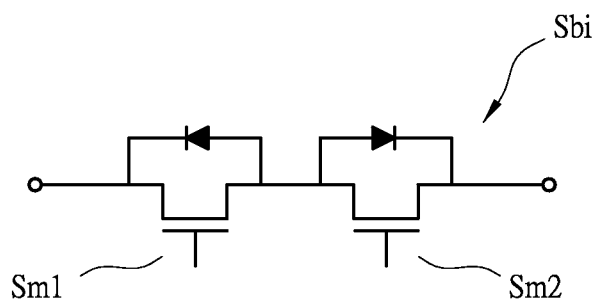
FIG. 6F is a circuit diagram of the bi-directional switch according to a sixth embodiment of the present disclosure.
Figure 6G:
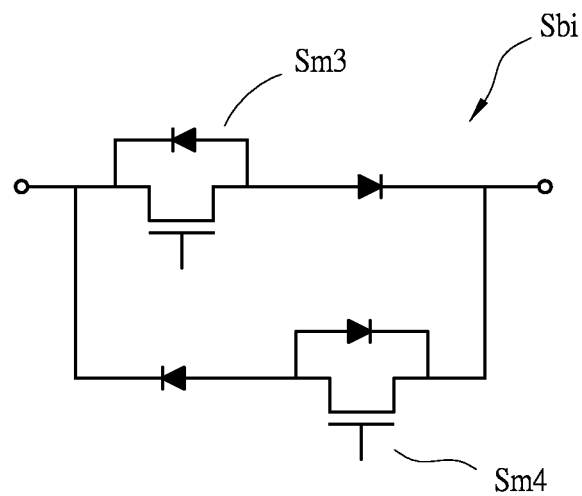
FIG. 6G is a circuit diagram of the bi-directional switch according to a seventh embodiment of the present disclosure.

In FIG. 6D and FIG. 6E, the bi-directional switch Sbi is composed of two gallium nitride (GaN) switches, and each GaN switch is connected in parallel to one body diode. In FIG. 6F and FIG. 6G, the bi-directional switch Sbi is composed of two silicon carbide (SiC) switches, and each SiC switch is connected in parallel to one body diode. The operations of controlling the GaN switches and the SiC switches can refer to the above-mentioned embodiments to implement the bi-directional soft switching function.

Figure 7A:
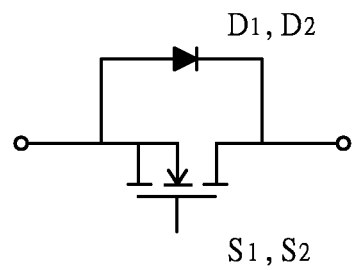
FIG. 7A is a circuit diagram of a first switch and a first diode or a second switch and a second diode according to a first embodiment of the present disclosure.
Figure 7B:
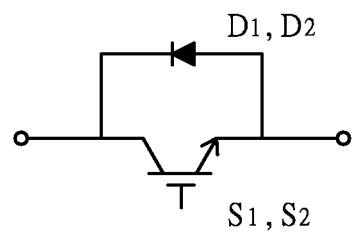
FIG. 7B is a circuit diagram of the first switch and the first diode or the second switch and the second diode according to a second embodiment of the present disclosure.

Reference is made to FIG. 7A and FIG. 7B which are circuit diagrams of a first switch and a first diode or a second switch and a second diode according to a first embodiment and a second embodiment of the present disclosure, respectively. In FIG. 7A, the first switch S1 or the second switch S2 is a MOSFET switch, and the MOSFET switch is connected in parallel to one body diode. In FIG. 7B, the first switch S1 or the second switch S2 is an IGBT switch, and the IGBT switch is connected in parallel to one diode. More specifically, the major difference between the two embodiments is that the diode connected to the MOSFET switch is the inherent parasitic diode and the diode connected to the IGBT switch is the real diode component.

Figure 8:
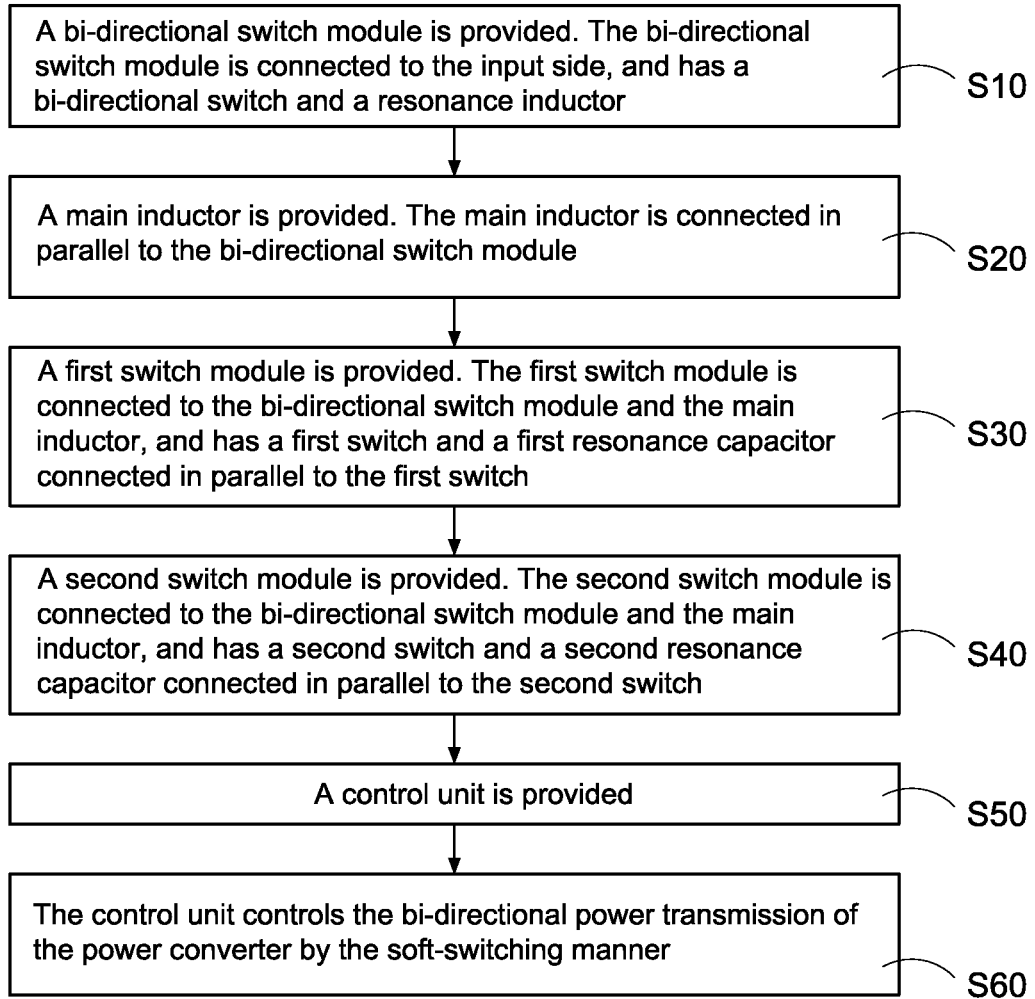
FIG. 8 is a flowchart of a method of operating a soft-switching bi-directional power converter according to the present disclosure.

Reference is made to FIG. 8 which is a flowchart of a method of operating a soft-switching bi-directional power converter according to the present disclosure. The soft-switching bi-directional power converter has an input side and an output side, and an input capacitor is connected at the input side and an output capacitor is connected at the output side. The method includes following steps. First, a bi-directional switch module is provided. The bi-directional switch module is connected to the input side, and has a bi-directional switch and a resonance inductor (S10). Afterward, a main inductor is provided. The main inductor is connected in parallel to the bi-directional switch module (S20).

Afterward, a first switch module is provided. The first switch module is connected to the bi-directional switch module and the main inductor, and has a first switch and a first resonance capacitor connected in parallel to the first switch (S30). The first switch module further includes a first diode which is connected in parallel to the first switch and the first resonance capacitor. Afterward, a second switch module is provided. The second switch module is connected to the bi-directional switch module and the main inductor, and has a second switch and a second resonance capacitor connected in parallel to the second switch (S40). The second switch module further includes a second diode which is connected in parallel to the second switch and the second resonance capacitor.

Afterward, a control unit is provided (S50). The control unit is operatively connected to the bi-directional switch module, the first switch module, and the second switch module. In other words, the control unit generates a bi-directional switch control signal, a first switch control signal, and a second switch control signal. Also, the bi-directional switch control signal is used to control the bi-directional switch, the first switch control signal is used to control the first switch, and the second switch control signal is used to control the second switch.

Finally, when a resonance occurs between the resonance inductor, the first resonance capacitor, and the second resonance capacitor, a voltage of the first resonance capacitor is reduced to zero and the control unit is configured to turn on the first switch and switch the first switch so that power generated from the bi-directional power converter is transmitted from the input side to the output side; when the resonance occurs between the resonance inductor, the first resonance capacitor, and the second resonance capacitor, a voltage of the second resonance capacitor is reduced to zero and the control unit is configured to turn on the second switch and switch the second switch so that power generated from the bi-directional power converter is transmitted from the output side to the input side (S60).

More specifically, the control unit controls the bi-directional switch control signal turning on the bi-directional switch when the current flowing the resonance inductor is zero. Accordingly, the bi-directional switch is zero-current turned on to soft switch the bi-directional switch. Afterward, the control unit controls the first switch control signal turning on the first switch when the resonance occurs between the resonance inductor, the first resonance capacitor, and the second resonance capacitor, and the voltage of the first resonance capacitor is reduced to zero. Accordingly, the first switch is zero-voltage turned on to soft switch the first switch and the power generated from the soft-switching bi-directional power converter from the input side to the output side.

In addition, the control unit controls the bi-directional switch control signal turning on the bi-directional switch when the current flowing the resonance inductor is zero. Accordingly, the bi-directional switch is zero-current turned on to soft switch the bi-directional switch. Afterward, the control unit controls the second switch control signal turning on the second switch when the resonance occurs between the resonance inductor, the first resonance capacitor, and the second resonance capacitor, and the voltage of the second resonance capacitor is reduced to zero. Accordingly, the second switch is zero-voltage turned on to soft switch the second switch and the power generated from the soft-switching bi-directional power converter from the output side to the input side.

More specifically, the bi-directional switch can be several embodiments as follows.

1. The bi-directional switch is composed of two MOSFET switches. Each MOSFET switch is connected in parallel to one body diode. Further, one in-parallel MOSFET and body diode are connected in series to the other in-parallel MOSFET and body diode in the back-to-back connection so that the bi-directional switch module 10 can provide the bi-directional soft switching function. In this embodiment, the two sources of the two MOSFET switches are electrically connected to each other. The bi-directional switch control signal has a first bi-directional switch control signal and a second bi-directional switch control signal, and the first bi-directional switch control signal is used to control a first MOSFET switch and the second bi-directional switch control signal is used to control a second MOSFET switch. When the first bi-directional switch control signal is in a high-level condition to turn on the first MOSFET switch, the second bi-directional switch control signal is in a low-level condition to turn off the second MOSFET switch. Accordingly, the bi-directional switch module provides the soft switching function when the operation of transmitting the power from the input side to the output side. On the contrary, when the first bi-directional switch control signal is in a low-level condition to turn off the first MOSFET switch, the second bi-directional switch control signal is in a high-level condition to turn on the second MOSFET switch. Accordingly, the bi-directional switch module provides the soft switching function when the operation of transmitting the power from the output side to the input side.

2. The bi-directional switch is composed of two MOSFET switches and two diodes. Each MOSFET switch is connected in parallel to one body diode. Further, the in-parallel MOSFET and body diode are connected in series to one diode to form one electrical branch so that the bi-directional switch module can provide the bi-directional soft switching function through the two in-parallel electrical branches of the bi-directional switch Sbi. The bi-directional switch control signal has a first bi-directional switch control signal and a second bi-directional switch control signal, and the first bi-directional switch control signal is used to control a fourth MOSFET switch and the second bi-directional switch control signal is used to control a third MOSFET switch. When the first bi-directional switch control signal is in a high-level condition to turn on the fourth MOSFET switch, the second bi-directional switch control signal is in a low-level condition to turn off the third MOSFET switch. Accordingly, the bi-directional switch module provides the soft switching function when the operation of transmitting the power from the input side to the output side. On the contrary, when the first bi-directional switch control signal is in a low-level condition to turn off the fourth MOSFET switch, the second bi-directional switch control signal is in a high-level condition to turn on the third MOSFET switch. Accordingly, the bi-directional switch module provides the soft switching function when the operation of transmitting the power from the output side to the input side.

3. The bi-directional switch is composed of two IGBT switches and two diodes. Each IGBT switch is connected in series to one diode to form one electrical branch so that the bi-directional switch module can provide the bi-directional soft switching function through the two in-parallel electrical branches of the bi-directional switch. The bi-directional switch control signal has a first bi-directional switch control signal and a second bi-directional switch control signal, and the first bi-directional switch control signal is used to control a first IGBT switch and the second bi-directional switch control signal is used to control a second IGBT switch. When the first bi-directional switch control signal is in a high-level condition to turn on the first IGBT switch, the second bi-directional switch control signal is in a low-level condition to turn off the second IGBT switch. Accordingly, the bi-directional switch module provides the soft switching function when the operation of transmitting the power from the input side to the output side. On the contrary, when the first bi-directional switch control signal is in a low-level condition to turn off the first IGBT switch, the second bi-directional switch control signal is in a high-level condition to turn on the second IGBT switch. Accordingly, the bi-directional switch module provides the soft switching function when the operation of transmitting the power from the output side to the input side.

4. The bi-directional switch is composed of two gallium nitride (GaN) switches, and each GaN switch is connected in parallel to one body diode. In particular, the GaN switches can be connected in series or in parallel to implement the bi-directional soft switching function.

5. The bi-directional switch is composed of two silicon carbide (SiC) switches, and each SiC switch is connected in parallel to one body diode. In particular, the SiC switches can be connected in series or in parallel to implement the bi-directional soft switching function.

In conclusion, the present disclosure has following advantages:

1. The control unit 13 generates complementary control signals to correspondingly control two transistor switches of the bi-directional switch Sbi to implement soft-switching bi-directional operation;

2. The bi-directional switch Sbi is zero-current turned on, the first switch S1 is zero-voltage turned on, and the second switch S2 is zero-voltage turned on to implement the soft switching function, thus significantly reducing switching losses of the switch components; and 3. The gallium nitride (GaN) or the silicon carbide (SiC) is used to form the bi-directional switch Sbi and thereby achieve the low conduction losses and switching losses, high switching speed, and high heat resistance and high voltage resistance.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A soft-switching bi-directional power converter having an input side and an output side, the bi-directional power converter comprising:
    a bi-directional switch module connected to the input side, comprising:
        a bi-directional switch; and
        a resonance inductor connected to the bi-directional switch in series;
    a main inductor connected to the bi-directional switch module in parallel;
    a first switch module connected to the bi-directional switch module and the main inductor, having a first switch and a first resonance capacitor;
    a second switch module connected to the bi-directional switch module and the main inductor, having a second switch and a second resonance capacitor; and
    a control unit;
    wherein when a resonance occurs between the resonance inductor, the first resonance capacitor, and the second resonance capacitor, a voltage of the first resonance capacitor is reduced to zero and the control unit is configured to turn on the first switch and switch the first switch so that power generated from the bi-directional power converter is transmitted from the input side to the output side; when the resonance occurs between the resonance inductor, the first resonance capacitor, and the second resonance capacitor, a voltage of the second resonance capacitor is reduced to zero and the control unit is configured to turn on the second switch and switch the second switch so that power generated from the bi-directional power converter is transmitted from the output side to the input side;
    wherein the control unit is configured to generate a bi-directional switch control signal, a first switch control signal, and a second switch control signal; the bi-directional switch control signal is used to control the bi-directional switch, the first switch control signal is used to control the first switch, and the second switch control signal is used to control the second switch; and
    wherein the bi-directional switch control signal turns on the bi-directional switch when the first switch control signal and the second switch control signal are in a dead time between a falling edge of the second switch control signal and a rising edge of the first switch control signal or between a falling edge of the first switch control signal and a rising edge of the second switch control signal.

2. The soft-switching bi-directional power converter in claim 1, wherein the first switch control signal turns on the first switch when the bi-directional switch control signal turns on the bi-directional switch and after a first delay time to ensure the voltage of the first resonance capacitor is reduced to zero; the second switch control signal turns on the second switch when the bi-directional switch control signal turns on the bi-directional switch and after a second delay time to ensure the voltage of the second resonance capacitor is reduced to zero.

3. The soft-switching bi-directional power converter in claim 2, wherein the bi-directional switch control signal turns on the bi-directional switch when a current of the resonance inductor is zero; also the voltage of the first resonance capacitor is reduced to zero when the resonance occurs between the resonance inductor, the first resonance capacitor, and the second resonance capacitor so that the first switch control signal is high-level to turn on the first switch and then the first switch control signal switches the first switch so that power generated from the bi-directional power converter is transmitted from the input side to the output side.

4. The soft-switching bi-directional power converter in claim 3, wherein the second switch control signal and the first switch control signal are complementary signals and a dead time is inserted between the two switch control signals, or the second switch control signal is a low-level turned-off signal.

5. The soft-switching bi-directional power converter in claim 2, wherein the bi-directional switch control signal turns on the bi-directional switch when a current of the resonance inductor is zero; also the voltage of the second resonance capacitor is reduced to zero when the resonance occurs between the resonance inductor, the first resonance capacitor, and the second resonance capacitor so that the second switch control signal is high-level to turn on the second switch and then the second switch control signal switches the second switch so that power generated from the bi-directional power converter is transmitted from the output side to the input side.

6. The soft-switching bi-directional power converter in claim 5, wherein the first switch control signal and the second switch control signal are complementary signals and a dead time is inserted between the two switch control signals, or the first switch control signal is a low-level turned-off signal.

7. The soft-switching bi-directional power converter in claim 1, wherein the first switch module further includes a first diode which is connected to the first switch and the first resonance capacitor in parallel, wherein the first switch is connected to the first resonance capacitor in parallel; the second switch module further includes a second diode which is connected to the second switch and the second resonance capacitor in parallel, wherein the second switch is connected to the second resonance capacitor in parallel.

8. The soft-switching bi-directional power converter in claim 1, wherein the bi-directional switch are composed of two transistor switches in series or in parallel, and each transistor switch is a metal-oxide-semiconductor field-effect transistor (MOSFET) switch, an insulated-gate bipolar transistor (IGBT) switch, a gallium nitride (GaN) switch, or a silicon carbide (SiC) switch.

9. A method of operating a soft-switching bi-directional power converter, the soft-switching bi-directional power converter having an input side and an output side, the method comprising steps of:
(a) providing a bi-directional switch module, the bi-directional switch module connected to the input side, and having a bi-directional switch and a resonance inductor;
(b) providing a main inductor, the main inductor connected in parallel to the bi-directional switch module;
(c) providing a first switch module, the first switch module connected to the bi-directional switch module and the main inductor, and having a first switch and a first resonance capacitor;
(d) providing a second switch module, the second switch module connected to the bi-directional switch module and the main inductor, and having a second switch and a second resonance capacitor;
(e) providing a control unit; and
(f) reducing a voltage of the first resonance capacitor to zero and turning on the first switch and switching the first switch by the control unit so that power generated from the bi-directional power converter is transmitted from the input side to the output side when a resonance occurs between the resonance inductor, the first resonance capacitor, and the second resonance capacitor; reducing a voltage of the second resonance capacitor to zero and turning on the second switch and switching the second switch by the control unit so that power generated from the bi-directional power converter is transmitted from the output side to the input side when a resonance occurs between the resonance inductor, the first resonance capacitor, and the second resonance capacitor;
wherein the control unit is configured to generate a bi-directional switch control signal, a first switch control signal, and a second switch control signal; the bi-directional switch control signal is used to control the bi-directional switch, the first switch control signal is used to control the first switch, and the second switch control signal is used to control the second switch; and
wherein the bi-directional switch control signal turns on the bi-directional switch when the first switch control signal and the second switch control signal are in a dead time between a falling edge of the second switch control signal and a rising edge of the first switch control signal or between a falling edge of the first switch control signal and a rising edge of the second switch control signal.

10. The method of operating the soft-switching bi-directional power converter in claim 9, wherein the first switch control signal turns on the first switch when the bi-directional switch control signal turns on the bi-directional switch and after a first delay time to ensure the voltage of the first resonance capacitor is reduced to zero; the second switch control signal turns on the second switch when the bi-directional switch control signal turns on the bi-directional switch and after a second delay time to ensure the voltage of the second resonance capacitor is reduced to zero.

11. The method of operating the soft-switching bi-directional power converter in claim 10, wherein the bi-directional switch control signal turns on the bi-directional switch when a current of the resonance inductor is zero; also the voltage of the first resonance capacitor is reduced to zero when the resonance occurs between the resonance inductor, the first resonance capacitor, and the second resonance capacitor so that the first switch control signal is high-level to turn on the first switch and then the first switch control signal switches the first switch so that power generated from the bi-directional power converter is transmitted from the input side to the output side.

12. The method of operating the soft-switching bi-directional power converter in claim 11, wherein the second switch control signal and the first switch control signal are complementary signals and a dead time is inserted between the two switch control signals, or the second switch control signal is a low-level turned-off signal.

13. The method of operating the soft-switching bi-directional power converter in claim 10, wherein the bi-directional switch control signal turns on the bi-directional switch when a current of the resonance inductor is zero; also the voltage of the second resonance capacitor is reduced to zero when the resonance occurs between the resonance inductor, the first resonance capacitor, and the second resonance capacitor so that the second switch control signal is high-level to turn on the second switch and then the second switch control signal switches the second switch so that power generated from the bi-directional power converter is transmitted from the output side to the input side.

14. The method of operating the soft-switching bi-directional power converter in claim 13, wherein the first switch control signal and the second switch control signal are complementary signals and a dead time is inserted between the two switch control signals, or the first switch control signal is a low-level turned-off signal.

15. The method of operating the soft-switching bi-directional power converter in claim 9, wherein the first switch module further includes a first diode which is connected to the first switch and the first resonance capacitor in parallel, wherein the first switch is connected to the first resonance capacitor in parallel; the second switch module further includes a second diode which is connected to the second switch and the second resonance capacitor in parallel, wherein the second switch is connected to the second resonance capacitor in parallel.

16. The method of operating the soft-switching bi-directional power converter in claim 9, wherein the bi-directional switch are composed of two transistor switches in series or in parallel, and each transistor switch is a metal-oxide-semiconductor field-effect transistor (MOSFET) switch, an insulated-gate bipolar transistor (IGBT) switch, a gallium nitride (GaN) switch, or a silicon carbide (SiC) switch.

* * * * *